United States Patent [19]

Slanik

[11] Patent Number: 5,562,021

[45] Date of Patent: Oct. 8, 1996

[54] DEVICE FOR PREPARING GRAIN CAKES

[76] Inventor: Josef Slanik, 40 Caribou Crescent, Kirkland, Quebec, Canada, H9J 2H8

[21] Appl. No.: 518,416

[22] Filed: Aug. 16, 1995

[51] Int. Cl.$^6$ .............................. A23L 1/00; A23P 1/00; A47J 27/08; A47J 37/00

[52] U.S. Cl. .............................. 99/349; 99/353; 99/372; 99/439; 99/323.4; 100/93 P; 425/261; 425/447

[58] Field of Search ............................ 99/349, 352–355, 99/372, 373, 323.4; 426/523, 446; 100/93 P, 215; 425/261, 256, 260, 447

[56] References Cited

U.S. PATENT DOCUMENTS

| | | | |
|---|---|---|---|
| 4,281,593 | 8/1981 | Gevaert | 99/349 |
| 4,328,741 | 5/1982 | Yoshikazu | 99/332 |
| 4,340,343 | 7/1982 | Mancini | 425/91 |
| 4,667,588 | 5/1987 | Hayashi | 99/372 |
| 5,102,677 | 4/1992 | Van Den Berghe | 426/446 |
| 5,376,395 | 12/1994 | Pels | 426/446 |

*Primary Examiner*—Timothy F. Simone
*Attorney, Agent, or Firm*—Eric Fincham

[57] ABSTRACT

A device for preparing puffed food products from cereals such as rice wherein the cereal is subjected to pressure and heat, the device comprising a mold having a cavity defined by a wall thereabouts, an interior surface extending about the cavity, a piston moveable into and out of the cavity, there being provided a recess formed in the interior surface of the cavity wall with an insert being located within the recess. The insert permits greater tolerances in the manufacture of the device and also acts as a thermal insulator to minimize thermal changes.

10 Claims, 4 Drawing Sheets

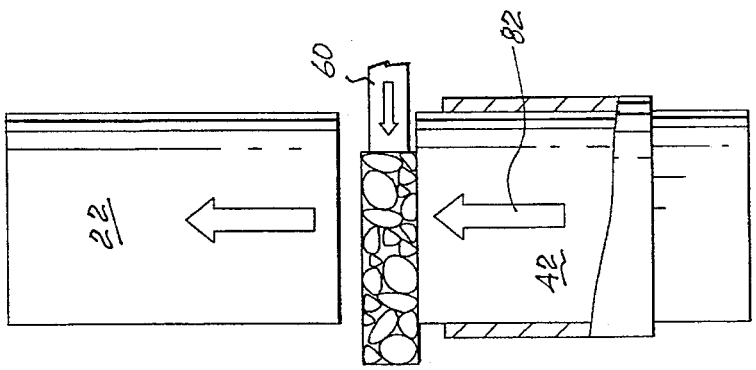
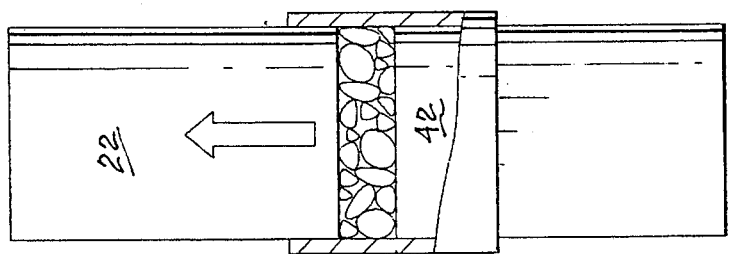
Fig-6d
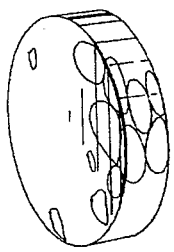
Fig-5c
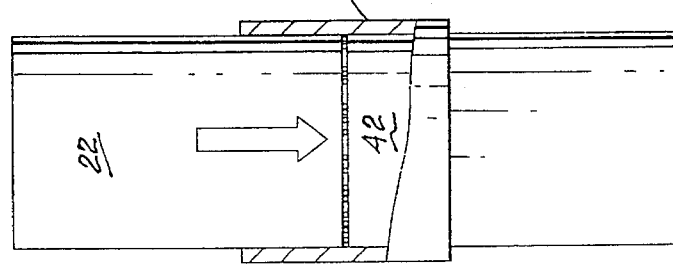
Fig-6c
Fig-5b
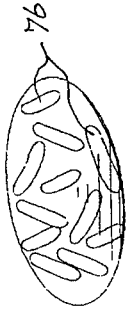
Fig-5a
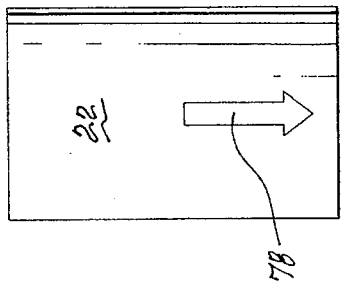
Fig-6b
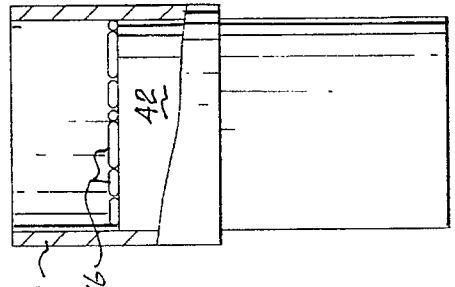
Fig-6a

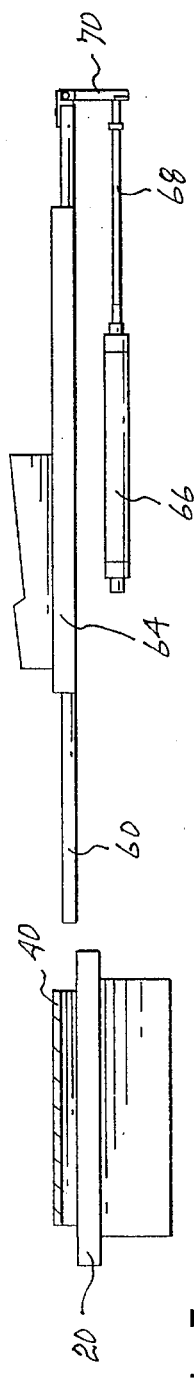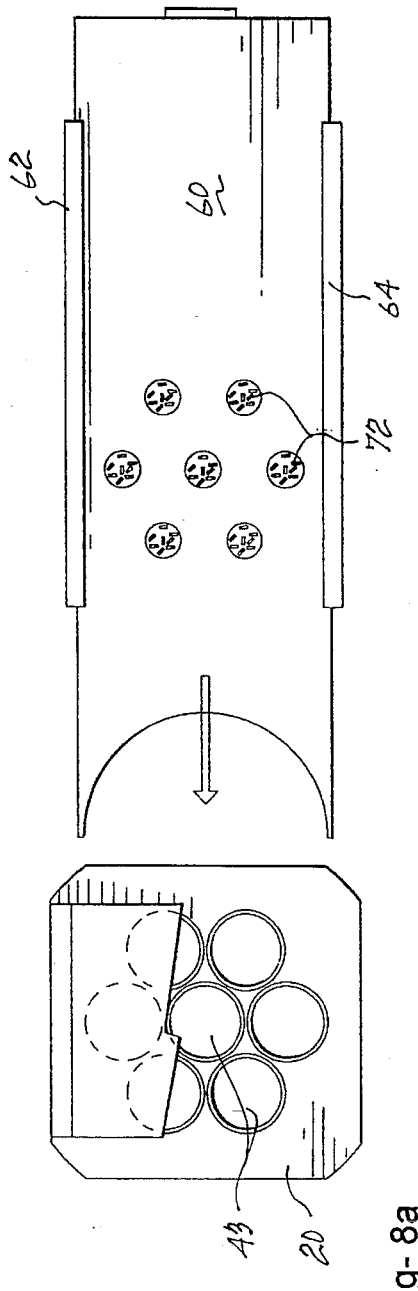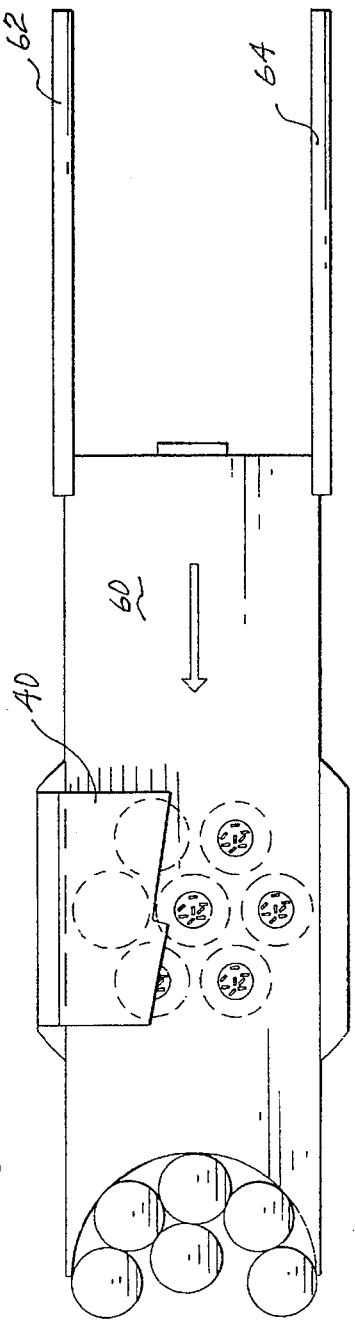
Fig-7
Fig-8a
Fig-8b

DEVICE FOR PREPARING GRAIN CAKES

BACKGROUND OF THE INVENTION

The present invention relates to a device for preparing food products from cooked and expanded cereals.

Devices for the cooking of cereal grains in the shape of a small cake are well known in the art. Among the grains which have been proposed for forming such cakes are corn, millet, rice, rye, wheat, oats, buckwheat, barley, and sorghum. However, despite the possibility of utilizing many such grains, it is primarily rice which has received the largest commercial acceptance. Among the reasons for this commercial acceptance is the fact that rice is one of the easier cereals to form into a self-supporting cake without the use of additives.

Methods and apparati capable of forming such rice cakes are well known in the art and may include an arrangement where a predetermined amount of rice is fed to a mold having a cavity formed therein. A piston applies a pressure to the rice to break the same and under pressure, the rice is heated for a certain period of time. The piston is then partially withdrawn to substantially release the pressure while the rice is contained within the cavity. As the pressure is released, the rice tends to expand to fill the cavity and while in this state, the grains bond together to form the cake. Subsequently, the piston is completely withdrawn and the cake is ejected.

An example of such a apparatus is disclosed in U.S. Pat. No. 4,281,593 to Gevaert. As shown therein, the patentee teaches a mold comprised of a hollow heated dye and a punch which is driven into and out of the mold cavity to exert the pressure on the mold when the cereal is cooked. Other systems are shown in U.S. Pat. Nos. 4,667,588 and 4,328,741.

Problems can occur in the operation of such machines. Thus, in order to have a successful operation, it is of importance that the punch or piston mates extremely closely with the walls of the mold in order to maintain the super atmospheric pressure required to cook the rice or cereal. This pressure must be maintained at an elevated temperature. This naturally creates problems since the very close tolerances required must be maintained both when the apparatus is hot and also when the apparatus is cool. A further complicating factor is that the operation of the apparatus can lead to a residue built up from the cereal grain.

As will be readily understood, the commercial operation of these systems has led to certain problems such as the seizing of the pistons while inside the mold or cavity.

In other words, problems have arisen since the apparatus or system must maintain the very close tolerances both when the system is cold—i.e. during the start up and when the system has reached operating temperatures. This problem becomes more severe as the system is in operation and accordingly, it has become known that the systems are constantly under repair.

Naturally, it would also be desirable to form as many of the final cake products as desirable at one time. In other words, if one is able to operate a system having a plurality of hollow dies and punches, the production efficiency is greatly increased. However, to date, the aforementioned problems have tended to discourage the building of such a system since a plurality of dies and punches would only tend to severely aggravate the problems.

It is an object of the present invention to provide improvements in the apparati for cooking cereal grains.

It is a further object of the present invention to provide a device for preparing an expanded cereal which is cooked under pressure and heat.

It is a further object of the present invention to provide a multi-cavity mold arrangement for the cooking of food products such as cereal grains.

It is a further object of the present invention to provide for a mold arrangement wherein a piston is reciprocally driven into and out of the mold for a means to allow for expansion within the mold.

SUMMARY OF THE INVENTION

According to one aspect of the present invention, there is provided a device for preparing food products from cereals which are subjected to pressure and heat, the device including a cavity defined by an exterior wall having an interior surface about the cavity. A piston is moveable into and out of the cavity. There is provided a recess which is formed in the interior surface of the cavity wall, the recess having a certain depth and height. An insert is located within the recess, the insert having an interior dimension approximately equal to the external dimension of the piston. The external dimension of the insert is less than the dimension of the recess such that the cylindrical insert can move within the recess.

In greater detail, and as aforementioned, the device of the present invention can be used in conjunction with systems for preparing food products from cereals. The cereals are subjected to pressure and heat. As such, the device and system of the present invention can be used with many different cereal grains.

The system of the present invention preferably includes means for taking a supply of the cereal grain, means for feeding the cereal grain into a cavity. Preferably the system includes a plurality of cavities such that a plurality of final products may be formed at the same time.

A number of different arrangements may be utilized for the arrangement of the mold or cavity into which the cereal grain is placed. Thus, one could utilize a conventional cavity having a piston or a punch associated therewith. However, for the sake of convenience, it is preferable that the bottom wall or base of the mold or cavity be moveable such that once the food product has been cooked, it may be ejected from the mold or cavity. To this end, it is preferable that one utilize an arrangement wherein a mold or a cavity is formed with the base thereof being a piston which is moveable to eject the food product from the mold after preparation.

The cavity or mold for forming the product may have any desired configuration. Thus, although it is conventional in the art to have cylindrically configurated punch or piston and a like configurated cavity or mold, any number of different configurations could be utilized according to the present invention.

The cavity or mold is at least partially defined by a wall surrounding the cavity and a piston or a punch is adapted to fit within the cavity. According to the present invention, there is provided a recess within the interior surface of the wall defining the cavity. This recess is preferably of a uniform depth and extends a sufficient height to surround the operational portion of the recess —i.e. the portion wherein the rice grains are cooked and wherein the pressure is released. The recess preferably has a depth of between 0.050 and 0.150 inches.

Sized to fit within the recess is an insert which has the same configuration as the wall and piston. However, the insert will have an interior dimension substantially equal to (slightly larger) the exterior dimension of the piston which fits within the recess while having an exterior dimension less that the dimensions defining the recess such that the insert will be freely moveable in a radial direction within the recess to allow for expansion. In other words, the insert will be free to expand outwardly and can float within the recess defined within the cavity wall.

It has been found that the arrangement of the floating insert, with the exterior of the insert being normally slightly spaced from the interior surface of the recess provides a certain insulating function which maintains the temperature of the cylinder and the insert at approximately equivalent values. This tends to overcome any problems due to thermal expansion which might otherwise be encountered.

Having thus generally described the invention, reference will be made to the accompanying drawings illustrating embodiments thereof:

BRIEF DESCRIPTION OF THE DRAWINGS

FIGS. 5a, 5b, and 5c illustrate the form of the cereal grains while undergoing the treatment process according to the present invention;

FIGS. 6a, 6b, 6c and 6d are a schematic views in side elevation, partially in a section, of the cooking of the cereal grain;

FIG. 7 is a side elevational view illustrating operation of a pusher plate for a placement of the cereal grains; and FIGS. 8a and 8b illustrate operation of the pusher plate in conjunction with the mold cavities.

DESCRIPTION OF THE PREFERRED EMBODIMENTS

Figure 3:
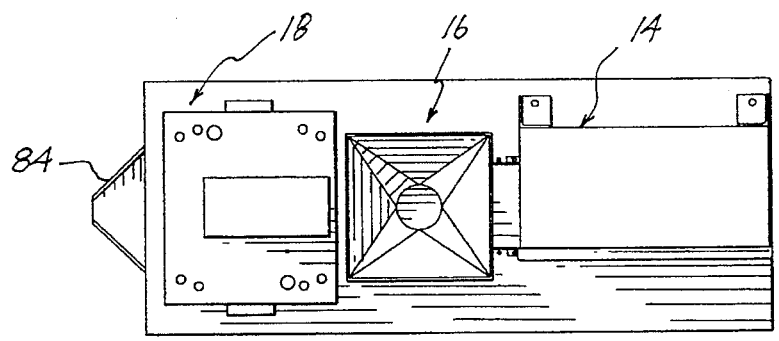
FIG. 3 is a top plan view thereof.
Figures 1, 2:
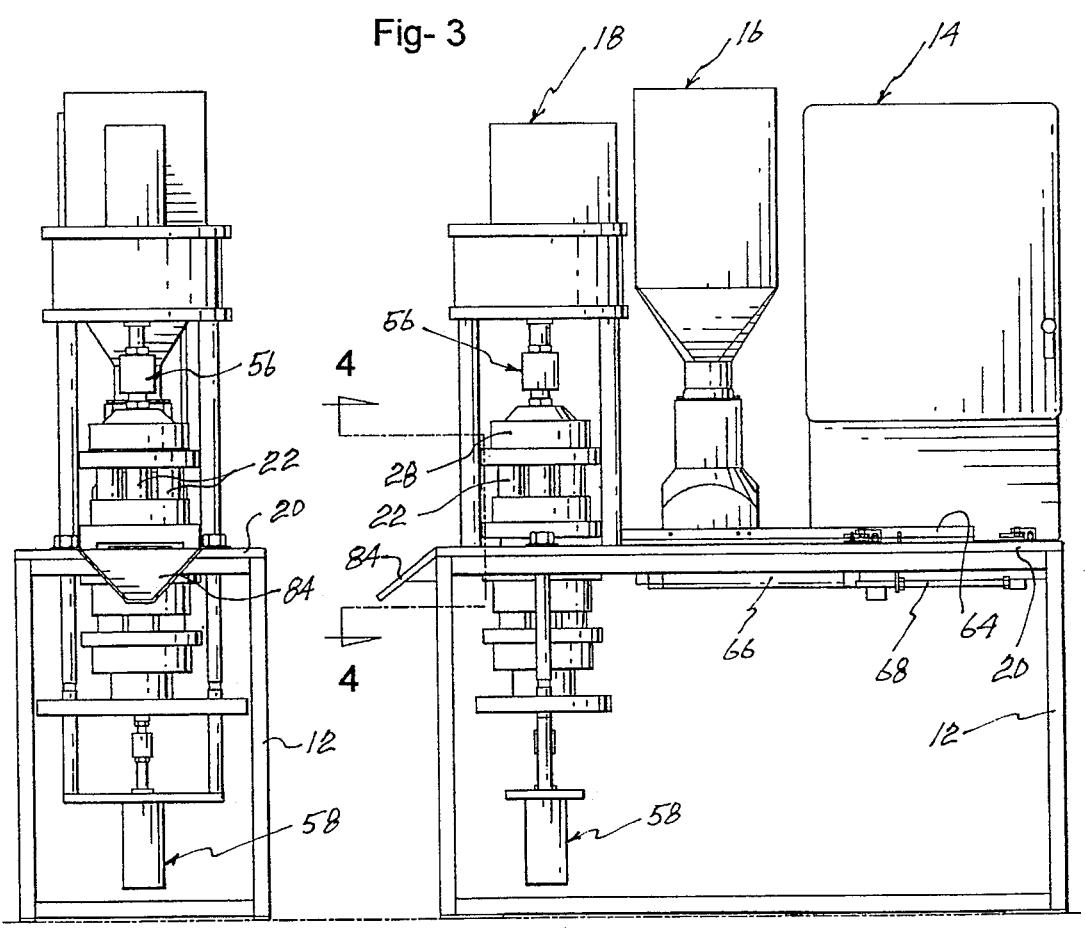
FIG. 1 is an elevational view of a cereal grain cooking system according to the present invention.
FIG. 2 is a side elevational view thereof as seen from the left hand side of FIG. 1.

Referring to the drawings in greater detail and by reference characters thereto, there is illustrated in FIGS. 1 and 2 an apparatus suitable for forming a food product from a cereal and which apparatus is generally designated by reference numeral 10.

Apparatus 10 includes a frame 12 on which are mounted three modules: a control panel module 14, a feed module 16 and a processing module 18. These modules are mounted on a table top 20 supported by frame 12.

Control panel module 14 and feed module 16 are not described in detail since their mechanisms are well known in the art. It suffices to say that control panel module 14 contains the necessary electrical control including computer processing interfaces while feed module 16 is adapted to receive a supply of the cereal grain and dispense it at the bottom as will be discussed in greater detail herein below.

Processing module 18 includes seven individual molds or cavities each adapted to form a single unit of the food product. These cavities or molds are substantially identical and reference will be made to FIG. 4 which illustrates three of the same.

Figure 4:
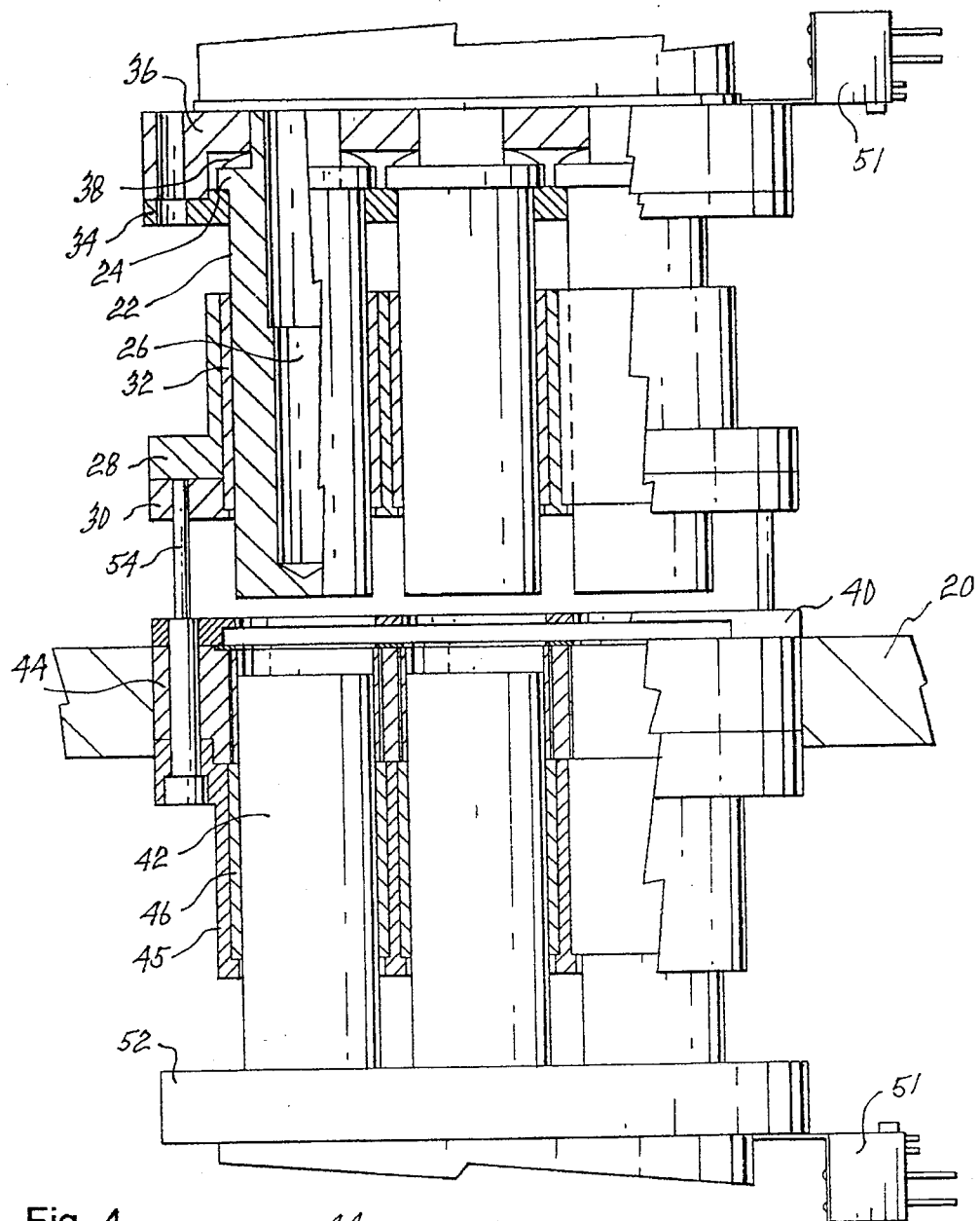
FIG. 4 is a view taken along the lines 4—4 of FIG. 1.

In greater detail, there are provided upper pistons 22,22' an 22". Each of these are identical and accordingly, only the left hand one as seen in FIG. 4 will be described. In this respect, upper piston 22 has an upper piston flange 24 extending therefrom. Mounted interiorly of upper piston 22 is a heater 26.

Upper piston 22 is mounted in an upper housing 28 to which is secured a retaining plate 30 which assists in retaining a bushing 32 which surrounds piston 22. A piston retaining plate 34 is provided at the upper portion of piston 22. In turn, piston retaining plate 34 is secured to pressure plate 36. As may be seen from FIG. 4, there is a space intermediate flange 24 and pressure plate 36 in which is placed an equalizing spring 38.

Mounted on table top 20 is a table top guide 40 for purposes which will become apparent herein below.

The lower part of the process module includes a lower piston 42 which is mounted in a lower housing 44 and piston 42 being surrounded by bushing 46. Intermediate upper piston 22 and lower piston 44 is a cavity generally designated by reference numeral 43.

Figure 4A:
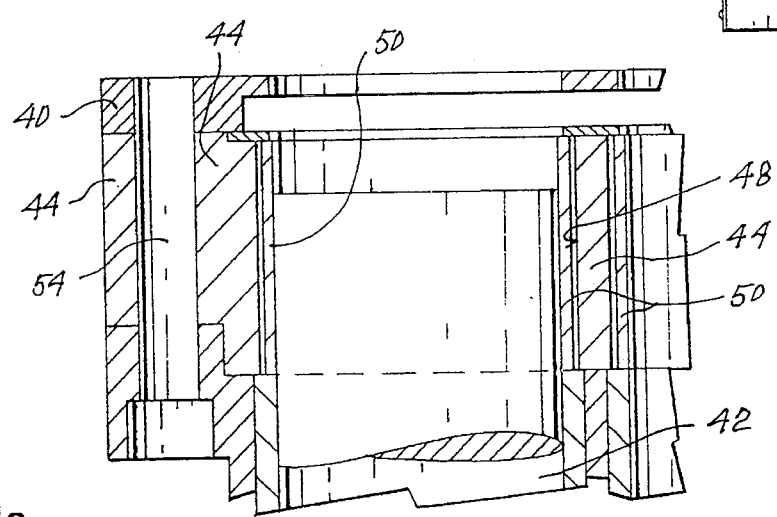
FIG. 4a is a detail view of a mold cavity.

As may be seen from FIG. 4a, cavity 43 is defined by the walls of lower housing 44 and in which is formed a recess 48. Mounted in recess 48 is a floating insert 50 and which insert 50, as may be seen, is sized to have an internal diameter which is approximately equal to that of the external diameter of pistons 22 and 42. The external diameter of insert 50, on the other hand, is less than that of recess 48 such that insert 50 "floats" within the recess. Thus, there is provided a gap between insert 50 and housing 44 such that the air provides and insulating effect whereby the temperature of insert 50 and the pistons is substantially the same. It will be noted that piston 42 is also heated in a manner similar to piston 22 and there are provided electrical connectors 51 for connecting the piston heaters.

A lower pressure plate 52, in a manner similar to upper pressure plate 36, is provided. It will be noted that housing 44 and upper housing 28 may be secured together by suitable screws 54.

Referring back to FIG. 1, there is provided an upper hydraulic cylinder 56 adapted to apply pressure to pressure plate 36 while a lower hydraulic cylinder 58 is adapted to supply the required pressure to lower pressure plate 52. In this regard, equalizing spring 38 provided between the top of piston flange 24 and pressure plate 36 permits the equalization of pressure across all the individual pistons.

Referring to FIGS. 7 and 8, there is mounted on table top 20 a pusher plate generally designated by reference numeral 60. Pusher plate 60 is mounted in a pair of parallel pusher plate guides 62 and 64. Below pusher plate 60 is a cylinder 66 having cylinder rod 68. A connecting member 70 interconnects cylinder rod 68 and pusher plate 60.

Provided in pusher plate 60 are a plurality of pusher cavities 72, there being one pusher plate cavity for each cavity 43 in the processing module. Pusher plate 60 has a concave front wall 74.

In operation, pusher plate 60 is positioned such that pusher plate cavities 72 are located under feed module 16. Individual cereal grains 76 are then metered to pusher plate cavities 72. Subsequently, cylinder 66 is activated to move pusher plate 60 in a direction indicated by arrow.75 and to the position illustrated in FIG. 8b. In this position, the cereal grains 76 enter their respective cavities 43.

Referring to FIGS. 5 and 6, the cereal grains 76 fall on the top of piston 42 and subsequently, piston 22 is forced downwardly as indicated by the arrow 78 to the position illustrated in FIG. 6b. The pressure is maintained for a desired period of time (for rice usually in the order of 3 seconds) following which pressure is released by moving cylinder 22 upwardly as indicated by arrow 80. The release of the pressure causes an expansion of cereal grains 76. The piston is maintained in the desired position for a further period of time. Subsequently, upper position 22 is retracted as shown in FIG. 6d and lower piston 42 activated as indicated by arrow 82 to move the cereal cake 86 out of cavity 43. Subsequently, pusher plate 60 is activated with the leading wall 74 pushing the cooked cakes down a discharge chute 84 while simultaneously bringing in further cereal grains 76.

The formation of the cereal cakes is illustrated in FIG. 5 and thus, as shown in FIG. 5a, initially the grains are present as individual grain. The pressure is applied in FIG. 6b to provide a crushed grain arrangement illustrated in FIG. 5b. Subsequently, the release of pressure as shown in FIG. 6O provides a cake structure illustrated in FIG. 5c.

It will be understood that the above described embodiment is for purposes of illustration only and that changes and modifications may be made thereto without departing from the spirit and scope of the invention.

I claim:

1. A device for preparing food products from cereals which are subjected to pressure and heat, the device comprising a cavity defined by a cavity wall having an interior surface about said cavity, at least one piston movable into and out of said cavity, a recess being formed in the interior surface of said cavity wall, said recess having a certain depth, an insert being located within said recess, said insert having an interior dimension at least equal to or slightly greater than the external dimension of said piston, said insert having an external dimension less than the internal dimension of said recess such that said insert can move within said recess.

2. The device of claim 1 wherein said cavity and said piston are of a generally cylindrical configuration.

3. The device of claim 1 wherein said device comprises a mold having a plurality of cavities.

4. The device of claim 1 wherein said piston includes a heater mounted interiorly thereof.

5. The device of claim 1 wherein a bottom of said cavity is defined by a lower piston, said lower piston being moveable within said cavity to eject a product therefrom.

6. An apparatus for producing a cooked cereal product, said apparatus comprising a mold having at least one cavity therein, a piston moveable into and out of said cavity, means for feeding a cereal grain to said cavity, said piston having heating means associated therewith, a recess being formed within a side wall about said cavity, an insert located within said recess, said insert being dimensioned to be slightly spaced from said side wall, said insert being dimensioned to have a size equal to or slightly larger than the dimension of said piston.

7. The apparatus of claim 6 wherein both said piston and said mold adjacent said cavity have heating means associated therewith.

8. The apparatus of claim 7 wherein said mold has a plurality of cavities formed therein.

9. The apparatus of claim 7 wherein said mold has at least five cavities formed therein.

10. The apparatus of claim 8 further including pressure equalizing means associated with each piston moveable into and out of said cavity, said pressure equalizing means being adapted to equalize the pressure within each cavity.

\* \* \* \* \*